United States Patent
Miyashita (10) Patent No.: US 8,525,769 B2
(45) Date of Patent: Sep. 3, 2013

(54) LIQUID CRYSTAL DISPLAY APPARATUS INCLUDING COLOR FILTERS OF RGBW MOSAIC ARRANGEMENT AND METHOD OF DRIVING THE SAME

(75) Inventor: Takashi Miyashita, Ome (JP)

(73) Assignee: Casio Computer Co., Ltd., Tokyo (JP)

( * ) Notice: Subject to any disclaimer, the term of this patent is extended or adjusted under 35 U.S.C. 154(b) by 530 days.

(21) Appl. No.: 12/769,860

(22) Filed: Apr. 29, 2010

(65) Prior Publication Data

US 2010/0328360 A1    Dec. 30, 2010

(30) Foreign Application Priority Data

Jun. 29, 2009    (JP) ................. 2009-154089

(51) Int. Cl.
    *G09G 3/36*    (2006.01)
(52) U.S. Cl.
    USPC ............................. 345/96; 345/209
(58) Field of Classification Search
    USPC ............................................. 345/96, 209
    See application file for complete search history.

(56) References Cited

U.S. PATENT DOCUMENTS

| | | | | |
|---|---|---|---|---|
| 6,833,888 B2 * | 12/2004 | Song et al. | ...... | 349/106 |
| 7,538,843 B2 * | 5/2009 | Kim | ...... | 349/139 |
| 7,629,955 B2 * | 12/2009 | Asao et al. | ...... | 345/96 |
| 7,746,335 B2 * | 6/2010 | Hsu | ...... | 345/209 |
| 2005/0275610 A1 | 12/2005 | Roh et al. | | |
| 2009/0051638 A1 | 2/2009 | Horiuchi et al. | | |

FOREIGN PATENT DOCUMENTS

| | | |
|---|---|---|
| JP | 2001-255409 A | 9/2001 |
| JP | 2005-346037 A | 12/2005 |
| JP | 2006-195436 A | 7/2006 |
| JP | 2006-259135 A | 9/2006 |
| JP | 2007-041551 A | 2/2007 |
| JP | 2007-79544 A | 3/2007 |
| JP | 2007-93832 A | 4/2007 |
| JP | 2007-156336 A | 6/2007 |
| JP | 2009-086262 A | 4/2009 |
| WO | WO 2007/088656 A1 | 8/2007 |

OTHER PUBLICATIONS

Japanese Office Action dated Apr. 12, 2011 (and English translation thereof) in counterpart Japanese Application No. 2009-154089.

* cited by examiner

*Primary Examiner* — Kwang-Su Yang
(74) *Attorney, Agent, or Firm* — Holtz, Holtz, Goodman & Chick, PC

(57) ABSTRACT

A liquid crystal display apparatus includes color filters, a display signal voltage application circuit, a common voltage application circuit, and a polarity inversion circuit. Each color filter corresponds to one of sub-pixels arranged two-dimensionally in a display section. The display signal voltage application circuit applies a display signal voltage to a pixel electrode of each of the sub-pixels. The common voltage application circuit applies a common voltage to a common electrode of each of the sub-pixels. The polarity inversion circuit inverts a polarity indicating a magnitude relationship between a pixel electrode voltage and the common voltage that is applied to the common electrode. The polarity inversion circuit makes the polarity of at least one of the sub-pixels arranged in a row of the display section different from the polarity of another sub-pixel of the same color arranged in the same row of the display section.

16 Claims, 7 Drawing Sheets

LIQUID CRYSTAL DISPLAY APPARATUS INCLUDING COLOR FILTERS OF RGBW MOSAIC ARRANGEMENT AND METHOD OF DRIVING THE SAME

CROSS-REFERENCE TO RELATED APPLICATIONS

This application is based upon and claims the benefit of priority from prior Japanese Patent Application No. 2009-154089, filed Jun. 29, 2009, the entire contents of which are incorporated herein by reference.

BACKGROUND OF THE INVENTION

1. Field of the Invention

The present invention relates to a liquid crystal display apparatus including color filters of RGBW mosaic arrangement and a method of driving the same.

2. Description of the Related Art

Conventionally, color display is provided using display pixels each including sub-pixels corresponding to a plurality of colors. For example, in a display apparatus including color filters with an RGB stripe arrangement, in which the three colors of red (R), green (G) and blue (B) are repeatedly arranged in the row direction, each of the display pixels corresponding to the three RGB colors forms a sub-pixel. Such a display apparatus provides color display by handling the sub-pixels of the three colors as the display pixel, and displaying the sub-pixels of the three colors in spatial division according to image data input by a unit of the display pixel.

Further, sub-pixel rendering has recently been used as a technique for enabling display of high-resolution images with a small number of display pixels. The sub-pixel rendering technique is a technique of applying a grayscale signal to be applied to a sub-pixel corresponding to a color in an arbitrary display pixel by superimposing the grayscale signal on sub-pixels arranged in the periphery of that pixel. By using such a sub-pixel rendering technique, it is possible to provide display with the resolution of the same level as that of the conventional RGB stripe arrangement, even if the number of sub-pixels is decreased to 2/3 of that of the conventional RGB stripe arrangement. By decreasing the total number of sub-pixels, it is possible to increase the pixel area of each sub-pixel to 3/2, and achieve a high aperture ratio.

Further, as an application of the sub-pixel rendering technique, there is proposed a liquid crystal display apparatus including color filters in which four sub-pixels of R, G, B and W [white] are arranged in a mosaic pattern(hereinafter referred to as RGBW mosaic arrangement), instead of the RGB stripe arrangement. By providing display using the sub-pixel rendering technique on such a liquid crystal display apparatus including color filters with the RGBW mosaic arrangement, it is possible to achieve improvement in white luminance (white transmittance) because of introduction of white pixels, as well as the high aperture ratio.

Liquid crystals used as display pixels of a liquid display apparatus have a characteristic that its properties are deteriorated by prolonged application of a direct-current voltage. The display pixels of liquid crystal display apparatuses are therefore generally driven by an alternating-current voltage, for the purpose of longer operating life and stabilized display of the liquid crystal display apparatuses. Dot inversion drive, which inverts the polarity of a voltage to be applied to display pixels by a unit of a sub-pixel, is known as an approach for the alternating-current voltage drive. It is also possible to suppress flicker at the time of display by using the dot inversion drive in alternating-current voltage drive of liquid crystals.

Figure 8A:
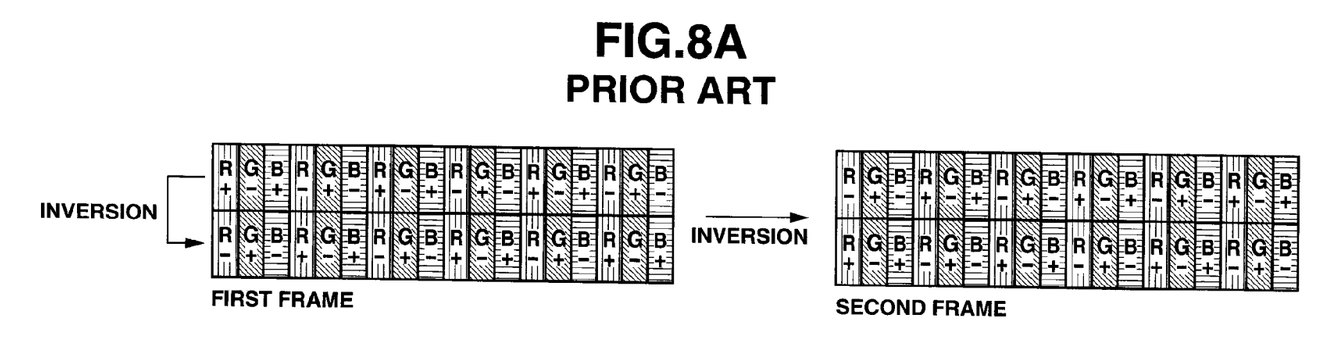
FIG. 8A illustrates a outline of the conventional dot inversion drive in the case of an RGB stripe arrangement.
Figure 8B:
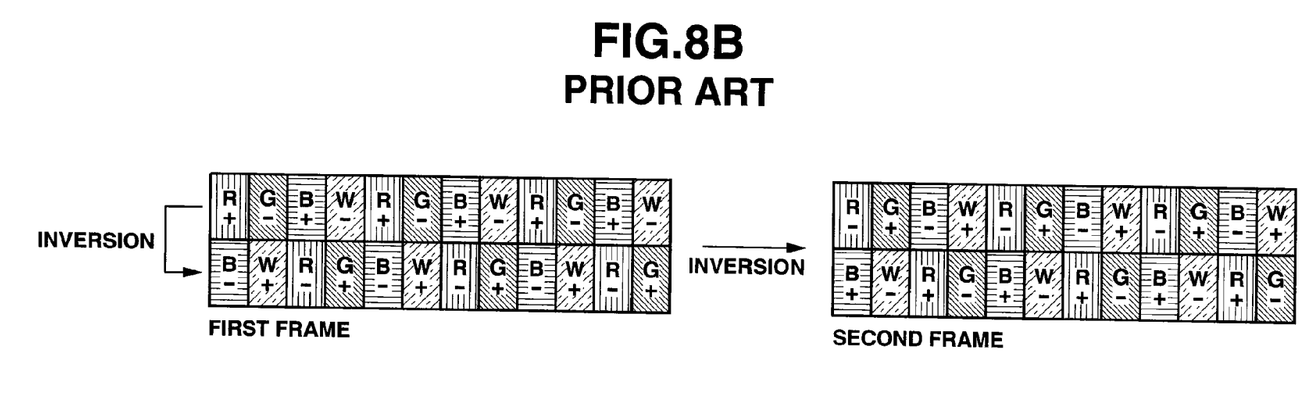
FIG. 8B illustrates an outline of the conventional dot inversion drive in the case of an RGBW mosaic arrangement.

Alternating-current voltage drive is needed at the time of driving a liquid crystal display apparatus with such an RGBW mosaic arrangement. When dot inversion drive is simply applied to a liquid crystal display apparatus with the RGBW mosaic arrangement, flicker increases compared to a case where dot inversion drive is applied to a liquid crystal display apparatus with the RGB stripe arrangement. This is because sub-pixels of the same color in the same row have the same polarity when the conventional dot inversion drive is applied to a liquid crystal display apparatus with the RGBW mosaic arrangement as shown in FIG. 8B, while the polarities of the sub-pixels of the same color in the same row alternate (the polarity is reversed every other pixel of the same color) and flicker is reduced when the conventional dot inversion drive is applied to a liquid crystal display apparatus with the RGB stripe arrangement, as shown in FIG. 8A.

Thus, when dot inversion drive is simply applied to a liquid crystal display apparatus with an RGBW mosaic arrangement, flicker is increased, which reduces the effect of the dot inversion drive to reduce the flicker.

BRIEF SUMMARY OF THE INVENTION

It is an object of the present invention to provide a liquid crystal display apparatus and a method of driving the same, capable of reducing flicker that occurs in a case when dot inversion drive is applied to a liquid crystal display apparatus with an RGBW mosaic arrangement.

According to a first aspect of the invention, there is provided a liquid crystal display apparatus, comprising: color filters arranged on a display section such that each of a plurality of sub-pixels arranged two-dimensionally corresponds to four components of a red component, a green component, a blue component, and a white component; a display signal voltage application circuit configured to apply a display signal voltage to a pixel electrode of each of the sub-pixels; a common voltage application circuit configured to apply a common voltage to a common electrode of each of the sub-pixels; and a polarity inversion circuit configured to invert a polarity indicating a magnitude relationship between a pixel electrode voltage determined based on the display signal voltage that is applied to each pixel electrode, and the common voltage that is applied to the common electrode on a sub-pixel-by-sub-pixel basis, wherein the polarity inversion circuit: treats successive sub-pixels of an odd number of three or more arranged in a first row of the display section as a unit, and divides the first row into a plurality of units, defines an inversion pattern in which polarities of adjacent sub-pixels in each unit are different from each other, and sets each unit to have the same inversion pattern, and makes the polarity of at least one of the sub-pixels arranged in the first row of the display section the same as the polarity of one of two sub-pixels on either side of at least one of the sub-pixels having the same color as the at least one of the sub-pixels, and different from the polarity of the other of the two sub-pixels, wherein the sub-pixels of the same color appear every four sub-pixels along a row direction.

According to a second aspect of the invention, there is provided a liquid crystal display apparatus, comprising: a color filter of a first color component arranged on a first sub-pixel; a color filter of a second color component arranged on a second sub-pixel arranged adjacent to the first sub-pixel along a column direction; a color filter of a third color component arranged on a third sub-pixel arranged adjacent to the first sub-pixel along a row direction; a color filter of a fourth color component arranged on a fourth sub-pixel arranged adjacent to the second sub-pixel along the row direction and adjacent to the third sub-pixel along the column direction; a display signal voltage application unit configured to apply a display signal voltage to a pixel electrode of each of a plurality of sub-pixels; a common voltage application unit configured to apply a common voltage to a common electrode of each of the plurality of sub-pixels; and a polarity inversion unit configured to invert a polarity indicating a magnitude relationship between a pixel electrode voltage determined based on the display signal voltage that is applied to each pixel electrode, and the common voltage that is applied to the common electrode on a sub-pixel-by-sub-pixel basis, wherein the polarity inversion unit: treats successive sub-pixels of an odd number of three or more arranged in a first row of a display section as a unit, and divides the first row into a plurality of units, defines an inversion pattern in which Polarities of adjacent sub-pixels in each unit are different from each other, and sets each unit to have the same inversion pattern, and makes the polarity of at least one of the sub-pixels arranged in the first row of the display section the same as the polarity of one of two sub-pixels on either side of the at least one of the sub-pixels having the same color as the at least one of the sub-pixels, and different from the polarity of the other of the two sub-pixels, wherein the sub-pixels of the same color appear every four sub-pixels along a row direction.

According to a third aspect of the invention, there is provided a method of driving a liquid crystal display apparatus including a display section provided with color filters corresponding to four components of a red component, a green component, a blue component, and a white component for a plurality of sub-pixels arranged two dimensionally, the method comprising: applying a common voltage to a common electrode of each of the sub-pixels of the display section; applying a display signal voltage to a pixel electrode of each of the sub-pixels; treating successive sub-pixels of an odd number of three or more arranged in a first row of the display section as a unit, and dividing the first row into a plurality of units; defining an inversion pattern in which polarities of adjacent sub-pixels in each unit are different from each other, and setting each unit to have the same inversion pattern; and making the polarity, which indicates a magnitude relationship between a pixel electrode voltage determined based on the display signal voltage that is applied to a pixel electrode of at least one of the sub-pixels arranged in the first row of the display section and the common voltage that is applied to the common electrode of the at least one of the sub-pixels, the same as the polarity of one of two sub-pixels on either side of the at least one of the sub-pixels having the same color as the at least one of the sub-pixels, and different from the polarity of the other of the two sub-pixels, wherein the sub-pixels of the same color appear every four sub-pixels along a row direction.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Hereinafter, an embodiment of the invention will be described with reference to the accompanying drawings.

Figure 1:
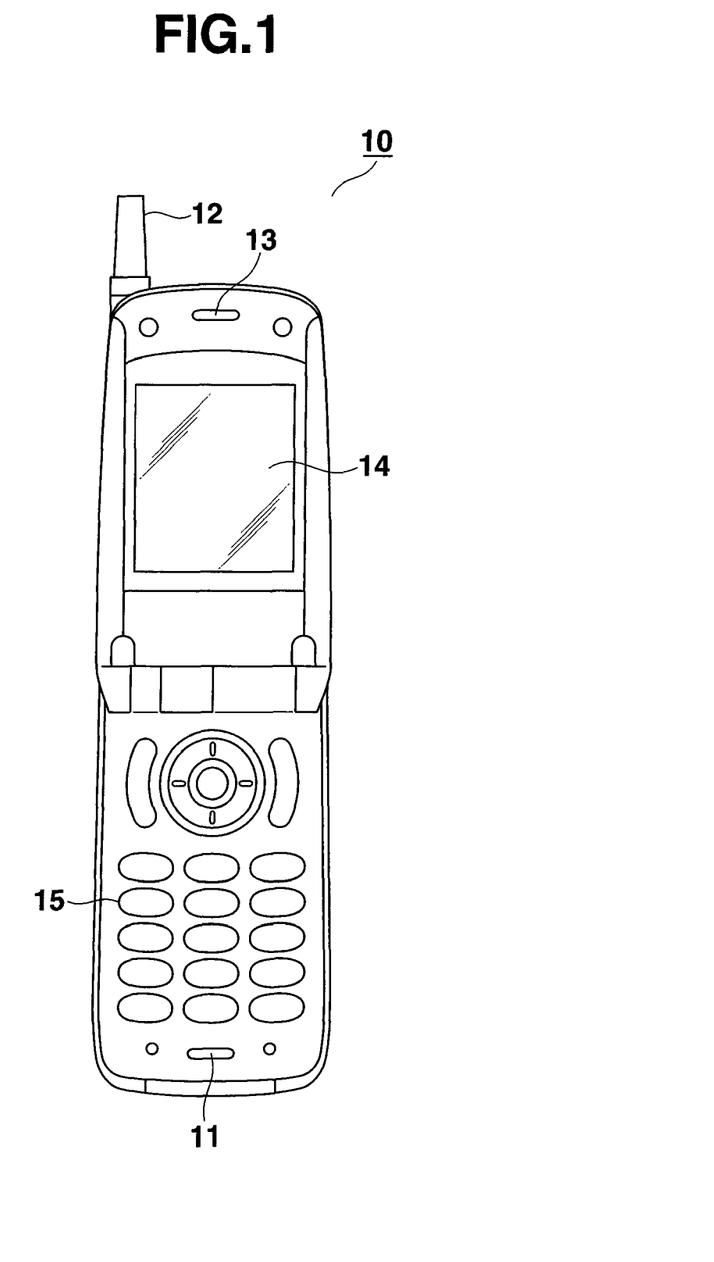
FIG. 1 illustrates an outer view of a mobile phone as an example of an electronic apparatus including a liquid crystal display apparatus according to an embodiment of the invention.

FIG. 1 shows an outer view of a mobile phone as an example of an electronic apparatus including a liquid crystal display apparatus, according to an embodiment of the invention. A mobile phone 10 shown in FIG. 1 includes a microphone 11, an antenna 12, a speaker 13, a liquid crystal display apparatus 14, and an operating section 15.

The microphone 11 is designed to convert audio input by a user of the mobile phone 10 into an electrical signal. The antenna 12 is an antenna used by the mobile phone 10, so as to perform communications with a base station, not shown. The speaker 13 is designed to convert an audio signal received by the antenna 12 via the base station from another mobile phone, for example, to an audio and output it. The liquid crystal display apparatus 14 is designed to display various types of images. The operating section 15 is an operating section used by the user of the mobile phone 10 so as operate the mobile phone 10.

Figure 2:
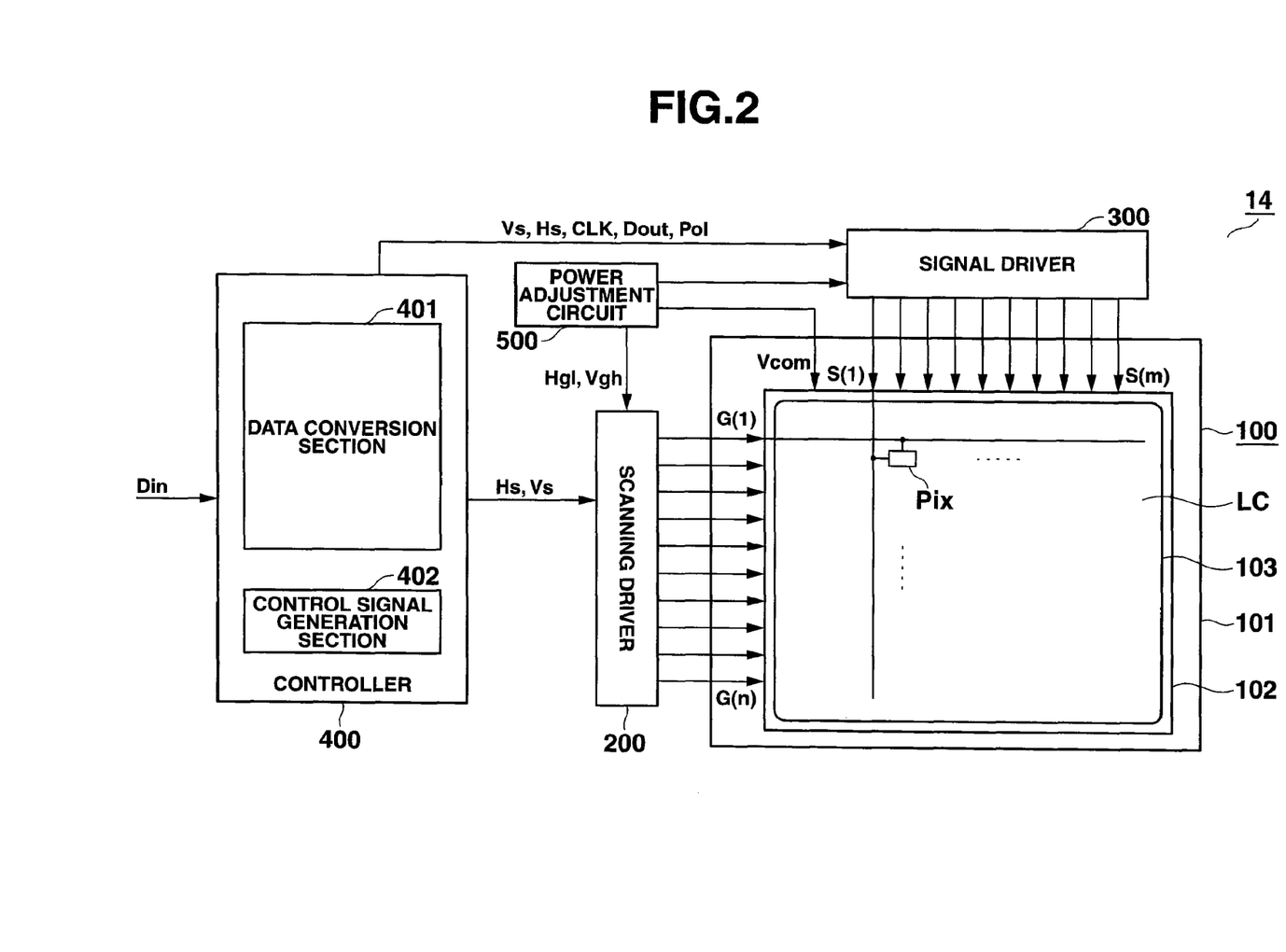
FIG. 2 illustrates a configuration of the liquid crystal display apparatus according to an embodiment of the invention.

FIG. 2 illustrates a configuration of a liquid crystal display apparatus 14 according to an embodiment of the invention. As shown in FIG. 2, the liquid crystal display apparatus 14 includes a display panel 100, a scanning driver 200, a signal driver 300, a controller 400, and a power adjustment circuit 500.

The display panel 100 is a display section configured to display images based on image data Din supplied from outside of the liquid crystal display apparatus 14. The display panel 100 is formed of a pixel-side substrate 101, an opposite-side substrate 102, and a liquid crystal layer LC interposed therebetween.

The pixel-side substrate 101 and the opposite-side substrate 102 are adhered to each other by a sealing material 103. Further, the sealing material 103 seals liquid crystals forming the liquid crystal layer LC such that the liquid crystals do not leak from between the pixel-side substrate 101 and the opposite-side substrate 102. Further, the pixel-side substrate 101 is a substrate such as a glass substrate, and is provided such that a plurality of scan lines G(j) (j=1, 2, ..., n) and a plurality of signal lines S(i) (i=1, 2, ..., m) extend so as to cross one another. Further, sub-pixels Pix are arranged in the positions corresponding to the intersections between the scan lines G(j) and the signal lines S(i), and the sub-pixels Pix are electrically connected to each of the scan lines G(j) and the signal lines S(i). Accordingly, n sub-pixels Pix are connected to each of the scan lines, and m sub-pixels Pix are connected to each of the signal lines. FIG. 2 shows only one sub-pixel.

Figure 3:
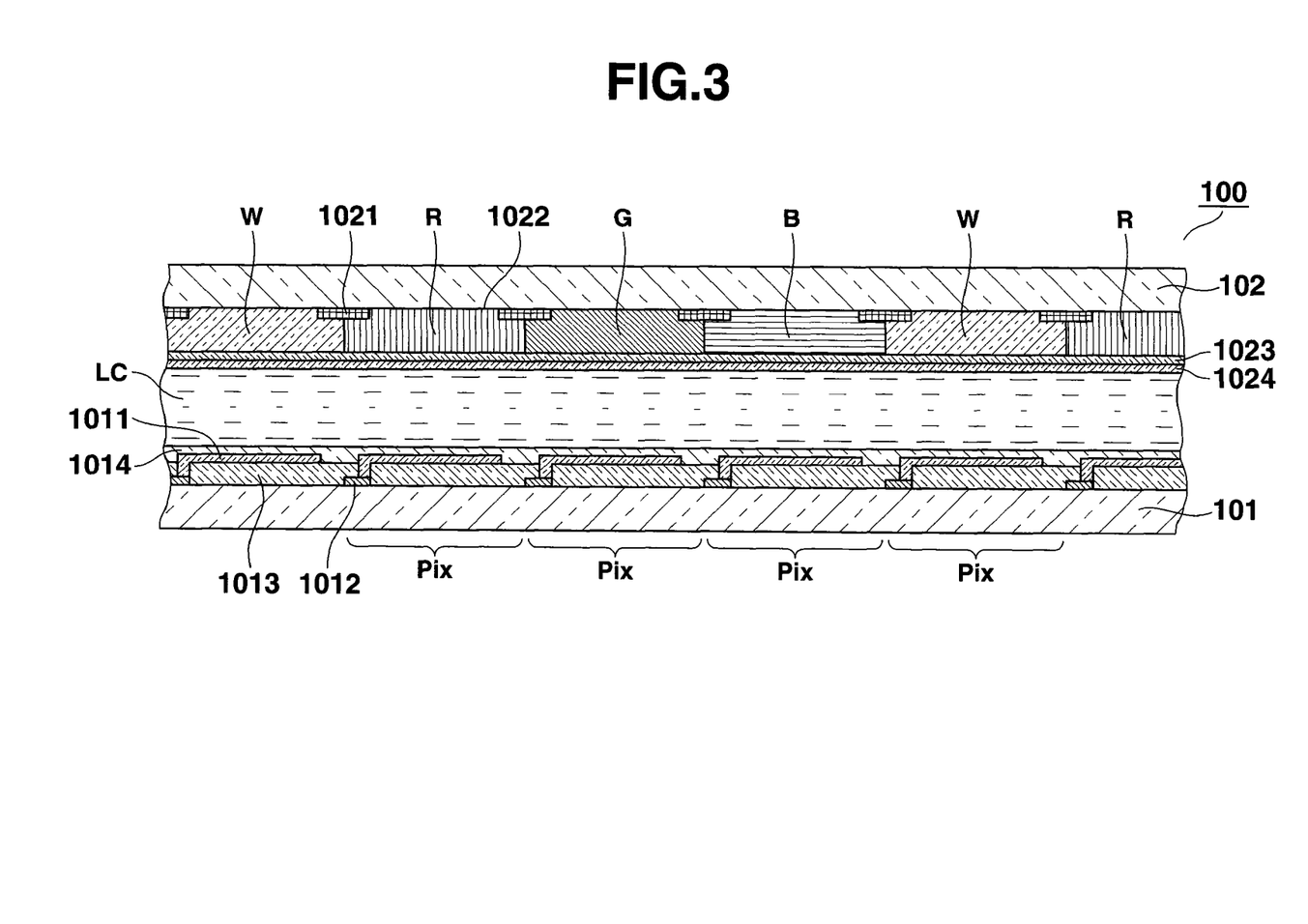
FIG. 3 illustrates a cross-sectional view of a display panel.

FIG. 3 is a cross-sectional view of the display panel 100. As shown in FIG. 3, the pixel-side substrate 101 is formed of a glass substrate, for example. Pixel electrodes 1011 each formed of a transparent conductive layer, such as indium tin oxide (ITO) layer, are formed on the pixel-side substrate 101, so as to correspond to the sub-pixels Pix forming a display pixel. Each pixel electrode 1011 is connected to a source electrode of a thin-film transistor (TFT) 1012, which functions as a switching element. Further, although not shown in FIG. 3, the gate electrode of the TFT 1012 is connected to a scan line G(j) to which the sub-pixel Pix corresponds, and the drain electrode of the TFT 1012 is connected to the signal line S(i) to which the sub-pixel Pix corresponds. The pixel electrode 1011 and the TFT 1012 are insulated from the pixel electrodes 1011 and the TFT 1012 in another sub-pixel Pix by the insulation layer 1013. An alignment film 1014 designed to define the initial alignment state of liquid crystals forming the liquid crystal layer LC, is formed in the pixel electrode 1011, so as to cover the pixel electrode 1011.

The opposite-side substrate 102 is a substrate having transparency, such as a glass substrate. A lattice-pattern light-shielding layer 1021 is formed on the side surface facing the pixel-side substrate 101 of the opposite-side substrate 102. The light shielding layer 1021 is formed such that its openings are provided in positions corresponding to the pixel electrodes 1011, and thereby the light shielding layer 1021 functions as a black matrix. Further, color filters 1022, including predetermined color components (red [R], green [G], blue [B] and white [W] in FIG. 3), each corresponding to each sub-pixel Pix, are provided in openings formed by the light-shielding layer 1021. Further, a common electrode 1023 is formed in the color filters 1022. The voltage of the common electrode 1023 is a voltage Vcom, which is a common voltage of the sub-pixels Pix. Further, an alignment film 1024 is formed in the common electrode 1023 so as to define the initial alignment state of liquid crystals forming the liquid crystal layer LC.

Figure 4:
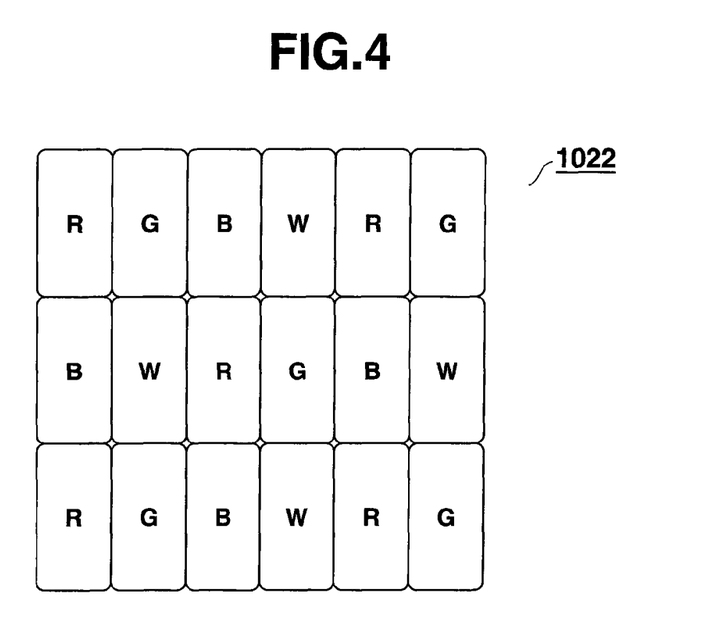
FIG. 4 illustrates color arrangement of color filters according to an embodiment of the invention.

FIG. 4 shows color arrangement of the color filters 1022 according to the embodiment. As shown in FIG. 4, the color filters 1022 in the embodiment have an RGBW mosaic arrangement in which a color filter R of a red component, a color filter G of a green component, a color filter B of a blue component, and a color filter W of a white component, for example, are arranged in a mosaic pattern. That is, the color filter R of the red component, the color filter G of the green component, the color filter B of the blue component, and the color filter W of the white component are arranged such that they are repeated in the row direction, and that color filters of the same color component are apart from one another every other two sub-pixels between adjacent pixel rows. By introducing W in addition to RGB, it is possible to improve luminance at the time of displaying white. In the embodiment, a display pixel is formed of a pair of a sub-pixel (red pixel) to which a color filter of a red component corresponds, and a sub-pixel (green pixel) to which a color filter of a green component corresponds, and a pair of a sub-pixel (blue pixel) to which a color filter of a blue component corresponds, and a sub-pixel (white pixel) to which a color filter of a white component corresponds. At the time of display of an image, a display sub-pixel is used in displaying another display sub-pixel adjacent to the display sub-pixel.

Figure 5:
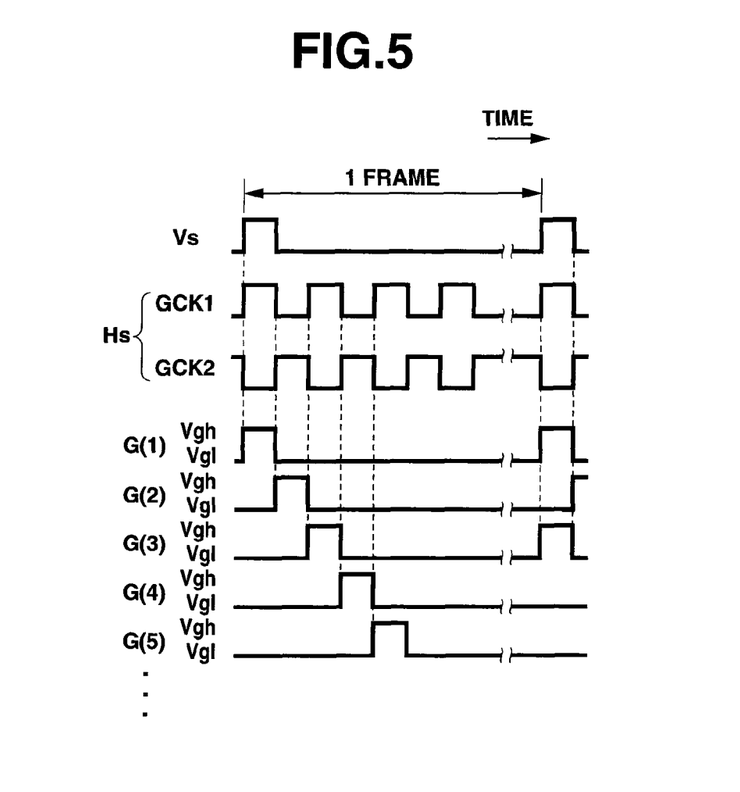
FIG. 5 is a timing chart showing operation of a scanning driver.

Referring back to FIG. 2, descriptions will be further made. The scanning driver 200 shown in FIG. 2 includes a shift register, for example, and sequentially applies a scanning signal to the scan line G(j) of the display panel 100. A vertical synchronization signal Vs and a first gate clock signal GCK1 and a second gate clock signal GCK2 as a horizontal synchronization signal Hs are inputted to the scanning driver 200 from the controller 400. As shown in FIG. 5, the scanning driver 200 starts applying a scanning signal to n scan lines whenever the vertical synchronization signal Vs is inputted. In this case, the scanning driver 200 switches the scanning signal for turning on a line of the TFT 1012 from a gate-off level Vgl to a gate-on level Vgh whenever the horizontal control signal Hs is received from the controller 400. The first gate clock signal GCK1 and the second gate clock signal GCK2 are rectangular signals having opposite phases.

As shown in FIG. 5, the vertical control signal Vs is applied per frame, which is a period of time for displaying each screen of the display panel 100. Further, the horizontal control signal Hs is applied per horizontal period, which is a period of time for writing a display signal voltage (grayscale signal) of each line (one scan line) of the display panel 100. The scanning driver 200 sequentially sets the voltage to the gate-on level Vgh, starting from the scan line G(1), so as to maintain synchronization with the horizontal control signal Hs. When the voltage of the scan line G(j) is set to the on level Vgh, the TFT 1012 connected to the scan line G(j) is set to a gate-on state. In this case, a display signal voltage applied to the signal line S(i) via the TFT 1012 set to the on-state is applied to a pixel electrode 1011 of a corresponding sub-pixel Pix.

Figure 6:
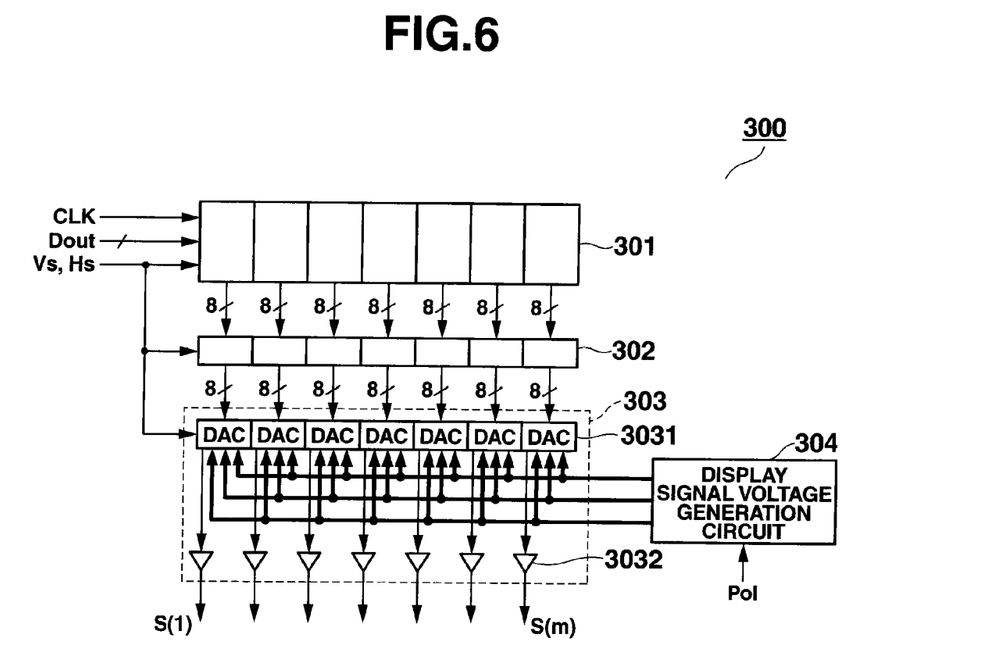
FIG. 6 illustrates a configuration of a signal driver.

The signal driver 300, which functions as a display signal voltage application circuit, applies a display signal voltage to the signal line S(i) of the display panel 100. The signal driver 300 includes a sampling memory 301, a data latch circuit 302, a digital-to-analog conversion circuit (DAC) 303, and a display signal voltage generation circuit 304, as shown in FIG. 6.

Upon receipt of a horizontal synchronization signal Hs output from the controller 400, the sampling memory 301 sequentially stores image data Dout corresponding to m sub-pixels Pix pixel by pixel, equivalent to a horizontal period, in synchronization with a standard clock signal CLK. Accordingly, the sampling memory 301 includes data storage areas equal in number to the signal lines S(i). It is to be noted that the image data Dout is grayscale level information that should be displayed in each sub-pixel, and is displayed as 8-bit data, for example.

Upon receipt of a horizontal synchronization signal Hs, the data latch circuit 302 instantaneously captures image data Dout of a horizontal period stored in each storage area of the sampling memory 301, and outputs the captured image data to the digital-to-analog conversion circuit 303.

The digital-to-analog conversion circuit 303 decodes the image data Dout output from the data latch circuit 302. The digital-to-analog conversion circuit 303 then selects a display signal voltage corresponding to the grayscale level information displayed as a decoded result from display signal voltages supplied from the display signal voltage generation circuit 304, and outputs the selected display signal voltage to a corresponding signal line S(i). The digital-to-analog conversion circuit 303 includes a plurality of DAC sections 3031 and output amplifiers 3032. The DAC section 3031 selects a display signal voltage supplied from the display signal voltage generation circuit 304 according to the decoded result of the image data Dout. The output amplifier 3032 amplifies the display signal voltage selected by the corresponding DAC section 3031 and outputs the amplified display signal voltage to a corresponding signal line S(i). The display signal voltage output to the signal line S(i) is applied to the pixel electrode 1011 via the TFT 1012 set to the on state by the scanning driver 200. Thereby, the difference in voltage between the common voltage and the pixel electrode voltage that is generated in the pixel electrode 1011 by the application of a display signal voltage is applied to the liquid crystal layer LC, and image is displayed in a corresponding sub-pixel.

The display signal voltage generation circuit 304 generates display signal voltages corresponding to grayscale levels (256 grayscales in the case where Dout is displayed as 8-bit data, for example) that can be taken by the image data Dout, by means of a resistive division scheme, in which a predetermined power voltage is divided by a plurality of resistances corresponding to the number of grayscale levels, for example. In this case, liquid crystals forming the liquid crystal layer LC have a characteristic of deteriorating its properties after prolonged application of a direct current voltage. Accordingly, the polarity of the voltage to be applied to the liquid crystal layer LC (magnitude relationship between the pixel electrode voltage and the common voltage) needs to be alternated to extend the life of liquid crystals, for example. To this end, dot inversion drive is used in the embodiment. Dot inversion drive is a drive scheme that changes the polarity of the voltage to be applied to the liquid crystal layer LC every other sub-pixel. The dot inversion drive allows the display signal voltage generation circuit 304 to generate both a display signal voltage at the positive electrode side having a voltage level higher than that of the common voltage, and a display signal voltage on the negative electrode side having a voltage level lower than that of the common voltage. Further, the display signal voltage generation circuit 304 selects the display signal voltage on the positive electrode side or the display signal voltage on the negative electrode side according to the polarity inversion control signal Pol, and supplies the selected display signal voltage to the digital-to-analog conversion circuit 303. Further, as will be described below, dot inversion drive is performed by handling three sub-pixels as a unit of polarity inversion as an example in the embodiment. Since dot inversion drive is performed by a unit of three sub-pixels, three display signal voltage supply lines are connected to the DAC section 3031 of the digital-to-analog conversion circuit 303 at every grayscale level as shown in FIG. 6. The display signal voltage generation circuit 304 supplies either positive or negative display signal voltage to the three display signal voltage supply lines, according to the polarity inversion control signal Pol.

Referring back to FIG. 2, descriptions will be further made. The controller 400 shown in FIG. 2 controls the scanning driver 200 and the signal driver 300 such that a desired image is displayed on the display panel 100. The controller 400 includes a data conversion section 401 and a control signal generation section 402, as shown in FIG. 2.

The data conversion section 401 subjects image data Din, which is supplied from outside, for example, and in which the grayscale level of a red component, a green component, and a blue component are associated with coordinates in an image, to a sub-pixel rendering process. Thereby, the data conversion section 401 converts the image data Din to image data Dout associated with the coordinate system corresponding to the color filters of the RGBW mosaic arrangement forming the display panel 100.

The control signal generation section 402 generates various types of control signals, such as the vertical synchronization signal Vs, the horizontal synchronization signal Hs, the polarity inversion control signal Pol, and the standard clock signal CLK. These generated control signals are in synchronization with the output timing of the image data Dout outputted from the data conversion section 401. The control signal generation section 402 outputs the generated control signals.

The power adjustment circuit 500, which functions as a common voltage application circuit, generates a power voltage for generating a common voltage Vcom from a predetermined power source, a gate-off level Vgl and a gate-on level Vgh of a scanning signal, and a voltage for generating a display signal voltage, and supplies the generated voltages to corresponding blocks.

Figure 7:
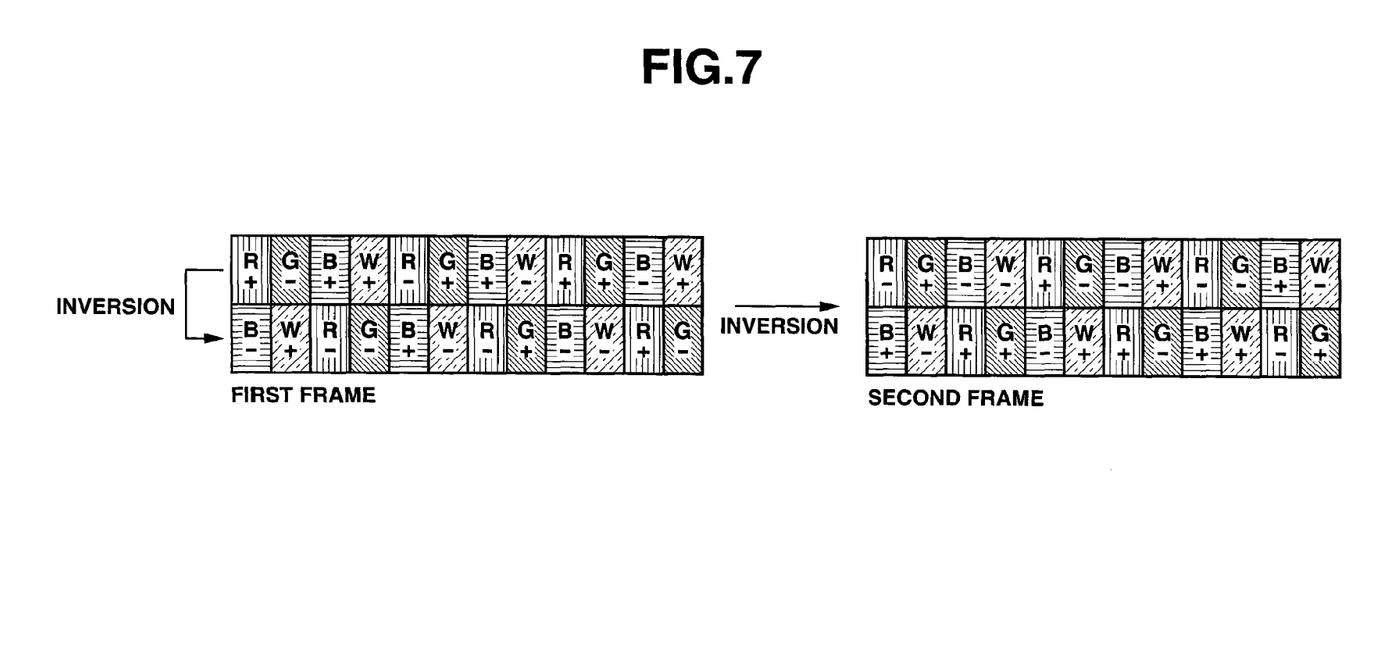
FIG. 7 illustrates an outline of dot inversion drive according to an embodiment of the present invention.

Next, dot inversion drive of a display pixel in the liquid crystal display apparatus with the above-described configuration according to the embodiment will be described. FIG. 7 illustrates an outline of the dot inversion drive according to the embodiment. In the case of color filters with the RGBW mosaic arrangement, when viewed from the row direction of the display panel 100, color filters of four color components of R, G, B and W are sequentially arranged, as shown in FIG. 7. Three sub-pixels in such a color arrangement are handled as a unit f d t inversion dlive in the embodiment, as shown in FIG. 7, and dot inversion drive is performed [[by]] in this unit, as shown in FIG. 7. That is, the sub-pixels are driven so that the polarities of the sub-pixels are inverted every other pixel sub-pixel in a unit. Accordingly, in the first row of the first frame in FIG. 7, for example, drive is performed so that the polarities of the three sub-pixels R, G, and B become +, −, and +, respectively, and the polarities of the next three sub-pixels become +, −, and +. The following sub-pixels will be driven in the same manner. The polarities of the sub-pixels in a unit do not need to follow the order of +, −, +, and inversion drive may be performed in the order of −, +, −. The above-described drive of the sub-pixels is performed in the display signal voltage generation circuit 304 of the signal driver 300, according to the polarity inversion control signal Pol from the control signal generation section 402 of the controller 400. Accordingly, the control signal generation section 402 and the display signal voltage generation circuit 304 form a polarity inversion circuit.

Further, in the second row, the sub-pixels are driven such that the polarities are inverted with respect to the sub-pixels in the same column of the first row. That is, in the second row of the first frame, drive is performed such that the first three sub-pixels B, W, and R become −, +, −, respectively, and the next three sub-pixels G, B, W become −, +, −, respectively. In the following row, too, the sub-pixels are determined such that the polarities are inverted with respect to the sub-pixels in the same column of the preceding row. That is, drive is performed such that the polarities of the sub-pixels becomes +, −, +, . . . in the odd-numbered row of the first frame, and the polarities of the sub-pixels become −, +, −, . . . in the even-numbered row of the first frame.

The drive of the sub-pixels is performed in the second frame such that the polarity is inverted with respect to the same row and the same column in the first frame. In the third and more frames, the sub-pixels are similarly driven such that the polarity is inverted with respect to the same row and the same column of the preceding frame.

By driving the sub-pixels as described above, some of the sub-pixels of the same row necessarily differ in polarity from another sub-pixel of the same color arranged in the same row. It is thereby possible to reduce flicker, compared to the simple dot inversion. Further, since dot inversion drive is performed such that the polarity is inverted every other sub-pixel in a unit, flicker is further reduced.

In the above-described embodiment, the three sub-pixels are handled as a unit, and dot inversion drive is performed in this unit. In actuality, however, in the case of an RGBW mosaic arrangement, by handling sub-pixels of an odd number of three or more as a unit, and Performing dot inversion drive in this unit, some of the sub-pixels in the same row necessarily differ in polarity from another sub-pixel of the same color arranged in the same row, when viewed in the same frame. For example, when five sub-pixels are handled as a unit, and dot inversion drive is performed in this unit, the polarities of the sub-pixels of each unit need to be set to +, −, +, −, +.

Alternatively, when sub-pixels of an even number of 6 or more are handled as a unit by performing dot inversion such that the polarity is inverted every two pixels sub-pixels in a unit, some of the sub-pixels in each row differ in polarity from another sub-pixel of the same color arranged in the same row.

Further, the above-described description exemplifies a case where the color components of the color filters show the example of the four colors of RGBW. The method of the embodiment, however, is applicable to a case where the number of color components of the color filters is 5 or more. That is, the approach of the embodiment is applicable to a liquid crystal display apparatus including color filters of various types of color arrangements by performing polarity inversion drive of sub-pixels so that the number of sub-pixels (number of drive polarity frequencies) forming a unit does not become a divisor (number of pixel structure frequencies) of the number of color components of the color filters.

The above-described embodiment describes a case where the liquid crystal display apparatus 14 is provided in a mobile phone as an example. However, the technique of the above-described embodiment is applicable to various types of electronic apparatuses, including a liquid crystal display apparatus such as a digital camera and a PDA.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A liquid crystal display apparatus, comprising:
    color filters arranged on a display section such that a plurality of sub-pixels arranged two-dimensionally correspond to four components of a red component, a green component, a blue component, and a white component;
    a display signal voltage application circuit configured to apply a display signal voltage to a pixel electrode of each of the sub-pixels;
    a common voltage application circuit configured to apply a common voltage to a common electrode of said each of the sub-pixels; and
    a polarity inversion circuit configured to invert a polarity indicating a magnitude relationship between a pixel electrode voltage determined based on the display signal voltage that is applied to said each pixel electrode, and the common voltage that is applied to the common electrode on a sub-pixel-by-sub-pixel basis,
    wherein the polarity inversion circuit:
    treats successive sub-pixels of an odd number of three or more arranged in a first row of the display section as a unit, and divides the first row into a plurality of units,
    defines an inversion pattern in which polarities of adjacent sub-pixels in each unit are different from each other, and sets said each unit to have the same inversion pattern, and
    makes the polarity of at least one of the sub-pixels arranged in the first row of the display section the same as the polarity of one of two sub-pixels on either side of the at least one of the sub-pixels having the same color as the at least one of the sub-pixels, and different from the polarity of the other of the two sub-pixels, wherein the sub-pixels of the same color appear every four sub-pixels along a row direction.

2. The liquid crystal display apparatus according to claim 1, wherein the color filters are arranged such that the red component, the green component, the blue component, and the white component have a periodically repeated arrangement in the first row of the display section, and arrangement in a second row which is adjacent to the first row is shifted by two sub-pixels from the periodically repeated arrangement of the first row.

3. The liquid crystal display apparatus according to claim 2, wherein the polarity inversion circuit is configured to invert a polarity of each of the sub-pixels in the second row adjacent to the first row of the display section from the polarity of each of the sub-pixels in the first row.

4. The liquid crystal display apparatus according to claim 3, wherein the polarity inversion circuit is configured to invert the polarity of said each of the sub-pixels in the first row of the display section at a time of next writing from the polarity of said each of the sub-pixels in the first row at a time of last writing.

5. The liquid crystal display apparatus according to claim 4, wherein the polarity inversion circuit is configured to invert the polarity of said each of the sub-pixels in the second row of the display section at the time of next writing from the polarity of said each of the sub-pixels in the second row at the time of last writing.

6. A liquid crystal display apparatus, comprising:
    a color filter of a first color component arranged on a first sub-pixel;
    a color filter of a second color component arranged on a second sub-pixel arranged adjacent to the first sub-pixel along a column direction;
    a color filter of a third color component arranged on a third sub-pixel arranged adjacent to the first sub-pixel along a row direction;
    a color filter of a fourth color component arranged on a fourth sub-pixel arranged adjacent to the second sub-pixel along the row direction and adjacent to the third sub-pixel along the column direction;
    a display signal voltage application unit configured to apply a display signal voltage to a pixel electrode of each of a plurality of sub-pixels;
    a common voltage application unit configured to apply a common voltage to a common electrode of said each of the plurality of sub-pixels; and
    a polarity inversion unit configured to invert a polarity indicating a magnitude relationship between a pixel electrode voltage determined based on the display signal voltage that is applied to said each pixel electrode, and the common voltage that is applied to the common electrode on a sub-pixel-by-sub-pixel basis,
    wherein the polarity inversion unit:
    treats successive sub-pixels of an odd number of three or more arranged in a first row of a display section as a unit, and divides the first row into a plurality of units,
    defines an inversion pattern in which polarities of adjacent sub-pixels in each unit are different from each other, and sets said each unit to have the same inversion pattern, and makes the polarity of at least one of the sub-pixels arranged in the first row of the display section the same as the polarity of one of two sub-pixels on either side of the at least one of the sub-pixels having the same color as the at least one of the sub-pixels, and different from the polarity of the other of the two sub-pixels, wherein the sub-pixels of the same color appear every four sub-pixels along the row direction.

7. The liquid crystal display apparatus according to claim 6, wherein the first color component is a red component, the second color component is a blue component, the third color component is a green component, and the fourth color component is a white component.

8. The liquid crystal display apparatus according to claim 7, wherein said each color filter is arranged such that the red component, the green component, the blue component, and the white component have a periodically repeated arrangement in the first row of the display section, and arrangement in a second row which is adjacent to the first row is shifted by two sub-pixels from the periodically repeated arrangement of the first row.

9. The liquid crystal display apparatus according to claim 8, wherein the polarity inversion unit is configured to invert a polarity of said each of the sub-pixels in the second row adjacent to the first row of the display section from the polarity of said each of the sub-pixels in the first row.

10. The liquid crystal display apparatus according to claim 9, wherein the polarity inversion unit is configured to invert the polarity of said each of the sub-pixels in the first row of the display section at a time of next writing from the polarity of said each of the sub-pixels in the first row at a time of last writing.

11. The liquid crystal display apparatus according to claim 10, wherein the polarity inversion unit is configured to invert the polarity of said each of the sub-pixels in the second row of the display section at the time of next writing from the polarity of said each of the sub-pixels in the second row at the time of last writing.

12. A method of driving a liquid crystal display apparatus including a display section provided with color filters corresponding to four components of a red component, a green component, a blue component, and a white component for a plurality of sub-pixels arranged two dimensionally, the method comprising:
applying a common voltage to a common electrode of each of the sub-pixels of the display section;
applying a display signal voltage to a pixel electrode of said each of the sub-pixels;
treating successive sub-pixels of an odd number of three or more arranged in a first row of the display section as a unit, and dividing the first row into a plurality of units;
defining an inversion pattern in which polarities of adjacent sub-pixels in each unit are different from each other, and setting said each unit to have the same inversion pattern; and
making the polarity, which indicates a magnitude relationship between a pixel electrode voltage determined based on the display signal voltage that is applied to a pixel electrode of at least one of the sub-pixels arranged in the first row of the display section and the common voltage that is applied to the common electrode of the at least one of the sub-pixels, the same as the polarity of one of two sub-pixels on either side of the at least one of the sub-pixels having the same color as the at least one of the sub-pixels, and different from the polarity of the other of the two sub-pixels, wherein the sub-pixels of the same color appear every four sub-pixels along a row direction.

13. The method of driving the liquid crystal display apparatus according to claim 12, wherein the color filters are arranged such that the red component, the green component, the blue component, and the white component have a periodically repeated arrangement in the first row of the display section, and an arrangement in a second row which is adjacent to the first row is shifted by two sub-pixels from the periodically repeated arrangement of the first row.

14. The method of driving the liquid crystal display apparatus according to claim 13, wherein when applying the display signal voltage to the pixel electrode of said each of the sub-pixels, a polarity of said each of the sub-pixels in the second row adjacent to the first row of the display section is inverted from the polarity of said each of the sub-pixels in the first row.

15. The method of driving the liquid crystal display apparatus according to claim 14, wherein when applying the display signal voltage to the pixel electrode of said each of the sub-pixels, the polarity of said each of the sub-pixels in the first row of the display section at a time of next writing is inverted from the polarity of said each of the sub-pixels in the first row at a time of last writing.

16. The method of driving the liquid crystal display apparatus according to claim 15, wherein when applying the display signal voltage to the pixel electrode of said each of the sub-pixels, the polarity of said each of the sub-pixels in the second row of the display section at the time of next writing is inverted from the polarity of said each of the sub-pixels in the second row at the time of last writing.

* * * * *